United States Patent
Woodward

[11] 3,905,744
[45] Sept. 16, 1975

[54] DIE MEMBER FOR BRIQUETTING APPARATUS

[75] Inventor: Bruce C. Woodward, Greensburg, Pa.

[73] Assignee: Kennametal Inc., Latrobe, Pa.

[22] Filed: Mar. 27, 1974

[21] Appl. No.: 455,136

Related U.S. Application Data

[62] Division of Ser. No. 302,515, Oct. 31, 1972, Pat. No. 3,829,267.

[52] U.S. Cl. .............. 425/471; 425/237; 425/363; 425/395; 249/139
[51] Int. Cl. ............................................. B29c 1/00
[58] Field of Search .......... 425/237, 335, 363, 470, 425/471, 395; 100/155 R; 29/118, 119; 74/230.13, 230.5, 243 DR; 249/139, 117

[56] References Cited
UNITED STATES PATENTS

| | | | |
|---|---|---|---|
| 538,475 | 4/1895 | Albrecht | 425/237 X |
| 552,317 | 12/1895 | Du Bral | 425/237 X |
| 844,330 | 2/1907 | Cole | 425/237 X |
| 915,332 | 3/1909 | Barnes | 425/237 X |
| 1,232,764 | 7/1917 | Brendage | 425/237 X |
| 1,775,277 | 9/1930 | Gahn | 425/237 X |
| 1,873,041 | 8/1932 | Robinson | 425/237 X |
| 2,958,902 | 11/1960 | Decker et al. | 425/237 X |
| 2,958,903 | 11/1960 | Decker | 425/237 X |
| 3,077,634 | 2/1963 | Komorek et al. | 100/155 R X |

*Primary Examiner*—Robert L. Spicer, Jr.
*Attorney, Agent, or Firm*—Melvin A. Crosby

[57] ABSTRACT

A die member for a briquetting apparatus in which two wheels in opposed relation rotate in opposite directions and have the die members mounted about the peripheries thereof with pocket means formed in the die members in which material fed between the rotating wheels is compacted into briquettes. The die members are formed of a hard wear resistant material such as cemented tungsten carbide and are detachably mounted on supporting block members which are, in turn, fixed to the peripheries of the respective wheels.

9 Claims, 5 Drawing Figures

DIE MEMBER FOR BRIQUETTING APPARATUS

RELATED U.S. APPLICATION

The present application is a division of U.S. Ser. No. 302,515, filed Oct. 31, 1972, now U.S. Pat. No. 3,829,267.

The present invention relates to die members for briquetting apparatus and is particularly concerned with die members formed of extremely hard wear resistant material.

Briquetting devices are known and, in general, comprise a pair of wheels in spaced relation in peripheral engagement with each other and rotating on parallel axes with the peripheries of the wheel being formed with cavities so that material fed between the rotating wheels is briquetted in the cavities.

A problem in connection with an apparatus of this nature is that the dies can wear and break and a great deal of lost time is encountered in connection with maintaining the apparatus in good operating order.

The die members which directly engage the material being briquetted wear rapidly and for this reason are preferably formed of a hard wear resistant material. Such a wear resistant material can be selected from the hard metal carbides, such as tungsten carbide, and it is proposed to form the dies from cemented metal carbides, especially tungsten carbide.

Cemented tungsten carbide is a suitable material for briquetting dies but must be properly supported in order to obtain the full benefits therefrom and to prevent the carbide material from fracturing, and it is in connection with such die members that the present invention is particularly concerned.

The primary object of the present invention is the provision of extremely hard wear resistant die members for briquetting apparatus so constructed that the die members can readily be installed and removed from the briquetting apparatus in a relatively short time.

A further object of the present invention is the provision of cemented hard metal carbide briquetting die members which are so configured that the die members can be kept to a minimum size thereby minimizing the cost of forming the die members.

Another object is the provision of a die member for briquetting apparatus which can be firmly clamped to the wheels of the apparatus in such a manner as to permit substantially the full strength of the material of the die members to be developed.

BRIEF SUMMARY OF THE INVENTION

According to the present invention, the opposed wheels of a briquetting apparatus are formed to have circumferentially distributed outwardly opening "V" shaped pockets. The pockets are adapted for receiving steel support blocks and which steel support blocks have outwardly facing grooves adapted for receiving hard wear resistant die members. The die members are adapted for being clamped in the grooves by wedge shaped lock bars.

Advantageously, the die members are formed of cemented hard metal carbide material and firmly engage the radially outer sides of the support blocks and which blocks, in turn, firmly engage the radially outwardly facing side of the main body member forming a part of the respective briquetting wheel.

These and other objects and advantages of the present invention will become more apparent upon reference to the following detailed specification taken in connection with the accompanying drawings in which.

Figure 1:
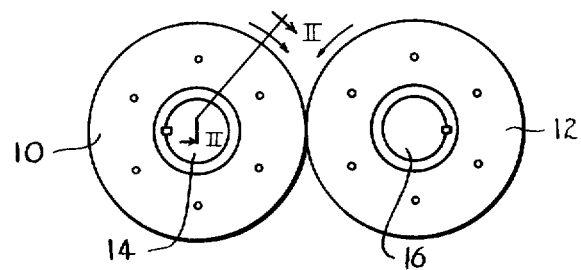
FIG. 1 is a schematic view looking at the end of two cooperating briquetting rolls.

DETAILED DESCRIPTION OF THE INVENTION:

Referring to the drawings somewhat more in detail, briquetting presses in which particulate material is compacted into briquettes are known and one common type employs wheels 10 and 12 mounted on shafts 14 and 16 respectively. Pockets formed around the peripheral portions of the wheels cooperate to compact material introduced, or fed, between the rotating wheels into briquettes comforming in size to the shape of the pockets.

Normally, the pockets on one wheel register with those on the other, but this is not necessarily the case, and a pocket on one wheel could be opposed to a blank area on the other wheel in which case each briquette would be the size of the pocket on the single wheel rather than the size of the combined pockets on both wheels.

Figure 2:
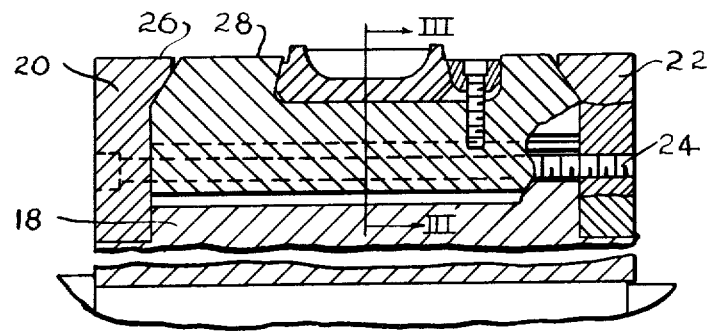
FIG. 2 is a partial section through one of the rolls drawn at enlarged scale and indicated by line II—II on FIG. 1.

FIG. 2 is a section through wheel 10 and shows that the wheel comprises a main body part 18 having a radial flange rings 20 and 22 detachably mounted on main body part 18 in opposed relation. Through bolts 24 are provided for clamping flange rings 20 and 22 fixedly in place on main body part 18.

Each of flange rings 20 and 22 at the radially outer edge has an inwardly extending rim part 26 and each of which inclines toward the central plane of the main body part in the radially outward direction.

The space defined between flange rings 20 and 22 is adapted for receiving a plurality of steel block members 28 conformed in shape to the said space so as to be fixedly supported therein when flange rings 20 and 22 are drawn up tight by bolts 24.

Figure 3:
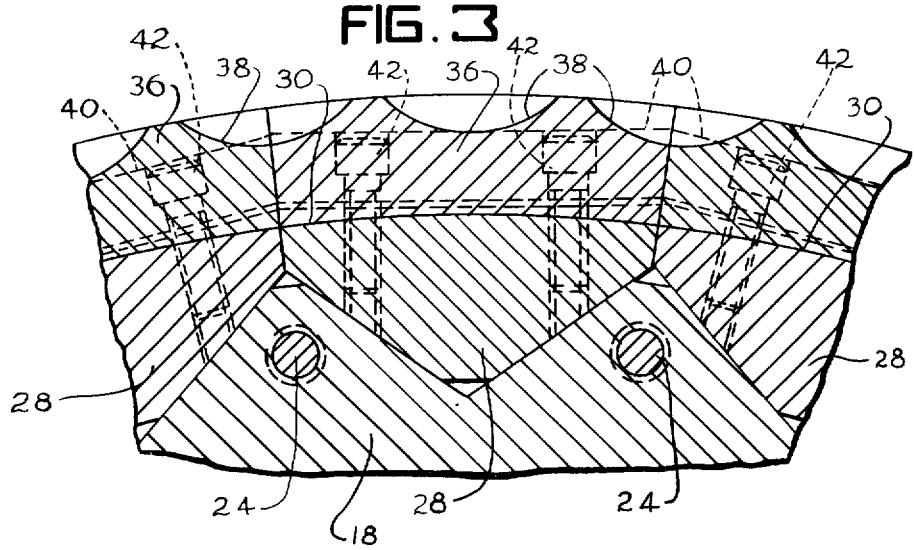
FIG. 3 is a sectional view indicated by line III—III on FIG. 2 and drawn at still further enlarged scale.

The steel block members 28 are configured as shown in FIG. 3 and have wedge-shaped inner parts which seat in correspondingly shaped pockets formed about main body member 18.

According to the present invention, each steel block member 28 has a groove 30 extending thereacross in such a direction as to be substantially tangential to the radius of the main body member which passes through the center of the steel block member. Each groove 30 has an inclined wall 32 at one side and a radial wall 34 at the other side. Each groove is adapted for receiving a hard wear resistant die member 36 having pocket means 38 formed therein and facing radially outwardly.

Each die member has inclined side walls, one of which mates with inclined wall 32 at one side of groove 30 and the other of which is adapted for being engaged by a wedge shaped locking member 40 interposed between the side of die member 38 and radial wall 34 of groove 30.

Bolts 42 extend through locking member 40 and into the respective steel block member 28 so that the locking member 40 can be drawn down tight thereby fixedly to wedge die member 36 in place while simultaneously the die member is thrust strongly downwardly against the bottom wall of groove 30. The die member 36 is thus held in a state of compression and is prevented from moving on the respective steel block member and is, in this manner, strongly and firmly supported in such a manner as to develop great strength.

Figure 4:
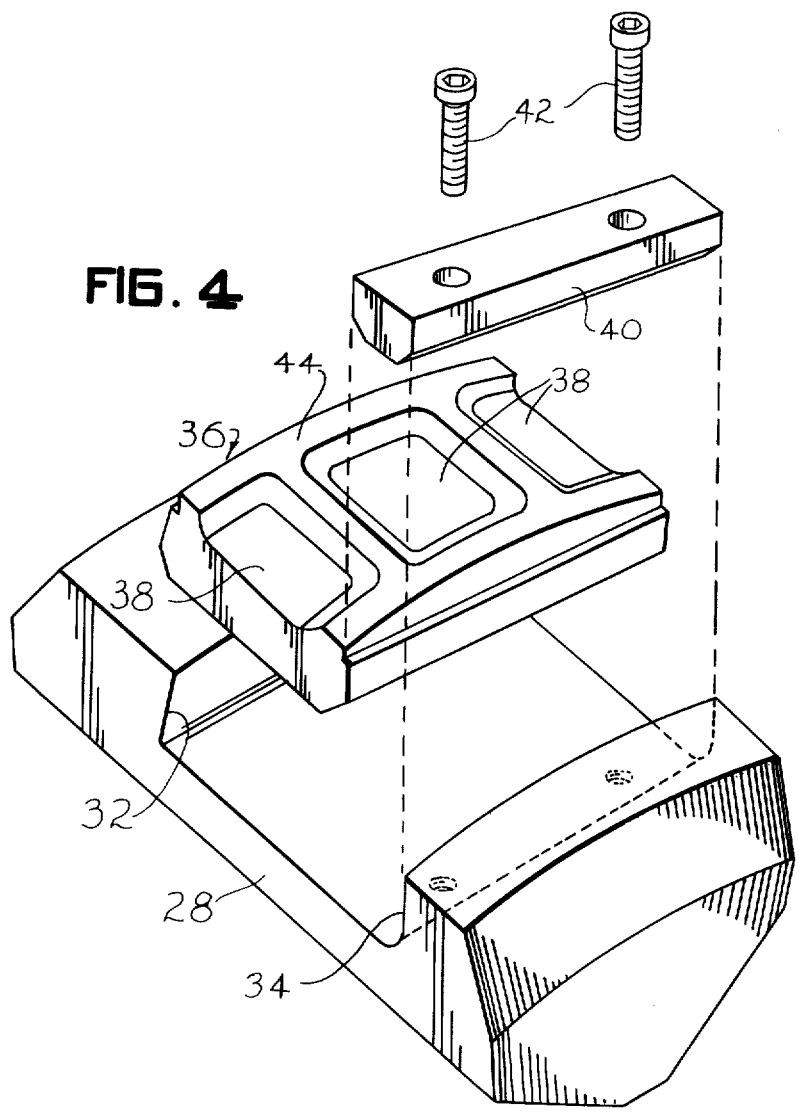
FIG. 4 is a perspective view showing the manner in which the die members, or segments, are assembled in the steel holders therefor.

As will best be seen in FIGS. 3 and 4, the radially outer side 44 of die member 36 is arcuately formed so as to be coaxial with the center of rotation of the respective main body member 18 while the wedge-shaped locking member 40 is advantageously straight. This provides for simple manufacture of the wedge-shaped locking member while the die member, which is a molded part, can be arcuately formed on the radially outer side with no inconvenience.

The particular advantage of the present arrangement is that the die members are relatively small and can, therefore, be manufactured from the hardest and most wear resistant material for long life without the die members becoming excessively expensive. For example, a hard cemented carbide material, such as cemented tungsten carbide, is an ideal material from which to fabricate the die members.

At the same time, even under the best circumstances, die members will fail, or become worn out, and it is of advantage to be able to replace the die members relatively quickly. The present invention provides for quick replacement of the die members because only the wedge-shaped locking member 40 needs to be removed to permit the respective die member to be removed from the main body part of the wheel. Wheels according to the prior art have been made in which the entire wheel must be taken apart to replace a die member with the disassembling of the wheel releasing all of the die members at one time.

Such a complete disassembling of the wheel is, usually, not only unnecessary, but it is also time consuming and laborious. Complete disassembling of the wheel is not necessary unless all of the die members are to be replaced at one time. The present invention permits selective replacement of the die members in case any one die member on a wheel becomes defective for any reason.

As will be particularly noted in FIGS. 3 and 4, each die member is adapted to cooperate with a die member adjacent thereto in forming one of the pockets of the respective wheel. Thus, each die member in FIG. 3 has a complete pocket formed in the center and has half pockets formed thereon at the ends.

A wheel made up according to FIG. 3, since it has two pockets for each die member, would have a total of 48 pockets about the entire periphery.

Figure 5:
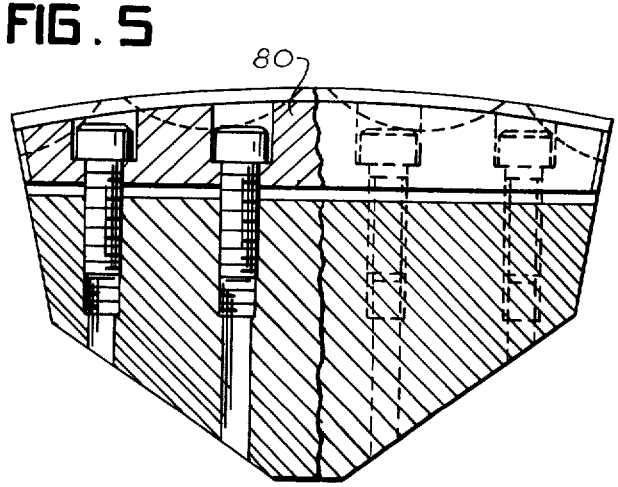
FIG. 5 is a view similar to FIG. 2 but showing a modification.

FIG. 5 shows an arrangement quite similar to that of FIGS. 2 and 3 except the pockets in the die member are arranged somewhat differently. The principal difference between the arrangement of FIGS. 2 and 3 and that of FIG. 5 is that in FIG. 5 the wedging lock member 80 is curved and the opposed wedging surface on the die member can also be curved thus insuring that the lateral support imparted to the die member extends radially outwardly to the maximum extent.

Modifications may be made within the scope of the appended claims.

What is claimed is:

1. A die member for a briquetting wheel, the briquetting wheel having a radially outwardly opening circumferential groove for receiving a plurality of like die members in end to end relation, each said die member comprising a block of cemented hard metal carbide material having pocket means on the radially outer side when the block is mounted in the groove, each said block also having a radially inner face and having said edge and planar end edges, said pocket means being convex outwardly when viewed from the side, said radially inner face adapted to rest on the bottom of the groove in the wheel, the said planar end edges of said block converging in the radially inward direction, said side edges being parallel when viewed in the radial direction and when viewed from an end of said block being convergent in the radially outward direction.

2. A die member according to claim 1 in which the planes of said end edges intersect at the center of curvature of said pocket means.

3. A die member according to claim 1 in which said radially inner face of said block is planar and perpendicular to that radius of curvature of said pocket means which passes through the center of the said block.

4. A die member according to claim 1 in which said metal carbide comprises tungsten carbide.

5. A die member according to claim 1 in which each of said side edges of said block are inclined toward the other in the radially outward direction.

6. A die member according to claim 5 in which the side edges of the die member are planar.

7. A die member according to claim 3 in which at least one side edge of the die member is curved.

8. A die member according to claim 5 which includes a steel support member for the die member, said support member having a groove on one side adapted to receive the die member, one side wall of the groove engaging one side edge of the die member, and a wedge bar clamped to said support member and wedged between the outer side wall of said groove and the other side edge of said die member.

9. A die member according to claim 8 in which one side wall of the groove is inclined so as to be parallel to the respective side edge of the die member while the other side wall of the groove and the other side edge of the die member diverge in the direction outwardly from the groove.

* * * * *